United States Patent
Koo et al.

(10) Patent No.: US 11,862,135 B2
(45) Date of Patent: Jan. 2, 2024

(54) POLYESTER SOUND ABSORPTION MATERIAL, METHOD OF MANUFACTURING MOLDED PRODUCT USING SAME, AND MOLDED PRODUCT MANUFACTURED THEREBY

(71) Applicants: Hyundai Motor Company, Seoul (KR); Kia Motors Corporation, Seoul (KR); Dong Jin Industrial Co., Ltd., Gyeongsangbuk-do (KR)

(72) Inventors: Hong Mo Koo, Gyeonggi-do (KR); Mi Jung Yun, Gyeonggi-do (KR); Joon Yong Song, Gyeonggi-do (KR); Hyun Dae Cho, Gyeonggi-do (KR); Hyung Joon Youn, Seoul (KR); Jeong Wook Lee, Gyeongsangbuk-do (KR)

(73) Assignees: Hyundai Motor Company, Seoul (KR); Kia Motors Corporation, Seoul (KR); Dong Jin Industrial Co., Ltd., Gyeongsangbuk-do (KR)

( * ) Notice: Subject to any disclaimer, the term of this patent is extended or adjusted under 35 U.S.C. 154(b) by 260 days.

(21) Appl. No.: 17/114,253

(22) Filed: Dec. 7, 2020

(65) Prior Publication Data
US 2021/0201881 A1    Jul. 1, 2021

(30) Foreign Application Priority Data
Dec. 26, 2019    (KR) .................. 10-2019-0174841

(51) Int. Cl.
*G10K 11/162*    (2006.01)
*B29C 43/00*    (2006.01)
(Continued)

(52) U.S. Cl.
CPC .......... *G10K 11/162* (2013.01); *B29C 43/006* (2013.01); *B29C 43/203* (2013.01);
(Continued)

(58) Field of Classification Search
CPC ... G10K 11/162; B29C 43/006; B29C 43/203; B29K 2067/003; B29K 2995/0002
See application file for complete search history.

(56) References Cited

U.S. PATENT DOCUMENTS

2007/0099524 A1* 5/2007 Porter .................... B32B 27/32
                                                         442/381
2016/0325698 A1* 11/2016 Lee .......................... B32B 5/10
2021/0201881 A1* 7/2021 Koo ..................... G10K 11/162

FOREIGN PATENT DOCUMENTS

KR         100405773 B1    11/2003
KR         2007-0071351 A    7/2007
(Continued)

OTHER PUBLICATIONS

English translation of WO-2005003422-A1 to Ogawa et al. obtained from PE2E database. (Year: 2005).*

(Continued)

*Primary Examiner* — Jeremy R Pierce
(74) *Attorney, Agent, or Firm* — Fox Rothschild LLP

(57) ABSTRACT

The present invention relates to a polyester sound absorption material having improved moldability and decreased weight and a method of manufacturing a molded product using the same, and more particularly to a polyester sound absorption material, which is capable of integrally molding a skin member and a sound absorption material using a felt including a polyester base fiber, a low-melting-point polyester adhesive fiber and a polyester hollow fiber, without the need to attach an additional sound absorption pad onto a skin member.

5 Claims, 7 Drawing Sheets

(51) Int. Cl.
*B29C 43/20* (2006.01)
*B29K 105/00* (2006.01)
*B29K 67/00* (2006.01)

(52) U.S. Cl.
CPC .... *B29K 2067/003* (2013.01); *B29K 2105/25* (2013.01); *B29K 2995/0002* (2013.01)

(56) References Cited

FOREIGN PATENT DOCUMENTS

| | | | | |
|---|---|---|---|---|
| KR | 100874262 B1 | 12/2008 | | |
| KR | 20170039404 A | * 4/2017 | ............. | B32B 27/12 |
| WO | WO-2005003422 A1 | * 1/2005 | ............. | D04H 1/413 |

OTHER PUBLICATIONS

English translation of KR-20170039404-A to Koo et al. obtained from PE2E database. (Year: 2017).*

* cited by examiner

POLYESTER SOUND ABSORPTION MATERIAL, METHOD OF MANUFACTURING MOLDED PRODUCT USING SAME, AND MOLDED PRODUCT MANUFACTURED THEREBY

CROSS REFERENCE TO RELATED APPLICATION

The present application claims priority based on Korean Patent Application No. 10-2019-0174841, filed on Dec. 26, 2019, the entire content of which is incorporated herein for all purposes by this reference.

TECHNICAL FIELD

The present invention relates to a polyester sound absorption material having improved moldability and decreased weight and a method of manufacturing a molded product using the same. The polyester sound absorption material, which is capable of integrally molding a skin member and a sound absorption material using a felt, can include a polyester base fiber, a low-melting-point polyester adhesive fiber and a polyester hollow fiber, and an additional sound absorption pad onto a skin member may not be necessary.

BACKGROUND

A conventional trunk trim part for a vehicle is manufactured in a manner in which a skin member (layer) and a substrate are formed and then a sound absorption material (a sound absorption pad) is attached to the part through an additional process in order to further increase sound absorption performance. This process has been manually performed because it requires attention to detail, which increases processing costs. Moreover, the skin member typically includes polyester, the substrate includes polypropylene and an inorganic material, and the sound absorption material includes polypropylene and polyester. Therefore, the components that constitute the individual trunk trim parts are different from each other, and thus a problem in that it is difficult to recycle parts after use thereof may occur.

Due to the above problem, there is constant need for a new sound absorption material and a molded product using the same, in which sound absorption performance may be maintained and processing costs may be reduced.

SUMMARY

In preferred aspects, provided are, inter alia, sound absorption materials, in which existing sound absorption performance is maintained and the weight of a vehicle part using the sound absorption material may be reduced.

Further, provided are the sound absorption materials in which a process of manufacturing a vehicle part using the sound absorption material may be simplified, thus reducing processing time and costs.

In an aspect, provided is a polyester sound absorption material that may include a felt. The felt may include a base fiber including a polyester resin, an adhesive fiber including a low-melting-point polyester resin, and a hollow fiber including a polyester resin, in which the cross-section of the hollow fiber has a circular shape or a non-circular shape and/or combinations thereof.

The term "felt" as used herein refers to a textile having a specific texture or structure of fibers formed by matting, condensing and/or pressing the fibers but without weaving. The felt may be a nonwoven fabric. The felt may have a web-like structure with certain degree of irregularity. In certain embodiments, the felt may be a web with arrangements of fibers (same or different fibers).

The term "low-melting point polyester resin" as used herein refers to a polyester resin that has a low-melting point or low-melting temperature compared to a melting temperature of a regular type polyester resin, for example, due to modification in chemical properties or composition of that fiber. For example, the low-melting point polyester may have a melting temperature lower, by at least about 10° C., 20° C., 30° C., 40° C., 50° C., 60° C., 70° C., 80° C., 90° C., 100° C., 150° C., 200° C., 250° C., 300° C. than that of the regular polyester. In certain particular aspects, a "low-melting point polyester resin" may suitably have a melting point of about 130° C. or less. One preferred "low-melting point polyester resin" may have a melting point in a range of from 80° C. to 110° C., which may be completely melt by heat treatment so as to induce the binding of other fibers and to secure rigidity by being in a solid form. Another preferred "low-melting point polyester resin" may have a melting point in a range of from 100° C. to 130° C., which may be used for the purpose of bonding with other fibers by melting the surface thereof by heat treatment. The term "hollow fiber" as used herein refers to a fiber that may have a structure that has an inner empty space, such as channel or hole, surrounded by a fiber material or other components such as filler surrounding the inner space. Preferred hollow fiber may include a core as a form of hole or channel without a filler material or other components.

The base fiber may include one or more selected from the group consisting of polyethylene terephthalate (PET), polybutylene terephthalate (PBT), polytrimethylene terephthalic acid (PTT), polyethylene naphthalate (PEN), polyethylene terephthalate glycol (PETG), and polycyclohexane dimethylene terephthalate (PCT).

The base fiber may suitably have a fineness of about 3 to 15 denier (De).

The felt may suitably include an amount of about 20 to 40 wt % of the base fiber based on the total weight of the felt.

The adhesive fiber may include one or more selected from the group consisting of polyethylene terephthalate (PET), polyethylene (PE), polypropylene (PP), and polyamide (PA).

The felt may suitably include an amount of about 40 to 60 wt % of the adhesive fiber based on the total weight of the felt.

The hollow fiber may suitably have a hollow core ratio of about 15 to 25%.

The hollow fiber may suitably have a fineness of about 3 to 15 denier (De).

The number of crimps in the hollow fiber may be about 10 to 25/inch.

The hollow fiber may include one or more selected from the group consisting of polyethylene terephthalate (PET), polybutylene terephthalate (PBT), polytrimethylene terephthalic acid (PTT), polyethylene naphthalate (PEN), polyethylene terephthalate glycol (PETG), and polycyclohexane dimethylene terephthalate (PCT).

The felt may suitably include an amount of about 15 to 25 wt % of the hollow fiber based on the total weight of the felt.

In an aspect, provided is a method of manufacturing a molded product using a polyester sound absorption material. The method may include manufacturing a sound absorption material 20 including i) a base fiber including a polyester resin, ii) an adhesive fiber including a low-melting-point polyester resin and iii) a hollow fiber including a polyester resin; preheating the sound absorption material 20 in an oven; and manufacturing a molded product by pressing the preheated sound absorption material 20 and a skin member 10 together. The molded product is configured such that the sound absorption material 20 may be integrally attached.

The sound absorption material 20 may suitably include an amount of about 20 to 40 wt % of the base fiber, an amount of about 40 to 60 wt % of the adhesive fiber and an amount of about 15 to 25 wt % of the hollow fiber, based on the total weight of the sound absorption material.

The pressing may be performed at a temperature of about 10 to 15° C. for about 40 to 50 sec.

The manufacturing the molded product may include preparing a mold 30 having the shape of a molded product, disposing a sound absorption material 20 and a skin member 10 in the mold 30, and subjecting the sound absorption material 20 and the skin member 10 to cold pressing.

The mold 30 may include a concave portion 31 for forming a sound absorption portion 21 having a convex shape on the sound absorption material 20.

The sound absorption material 20 located at the concave portion 31 of the mold 30 may exhibit a thickness change of less than about 3%.

Further provided is a molded product using a polyester sound absorption material that may be manufactured by the method described herein. For example, the sound absorption material 20 may be integrally attached to one surface of the molded product, the sound absorption material 20 including a sound absorption portion 21 having a convex shape.

The sound absorption portion 21 of the sound absorption material 20 may have a thickness of about 8 mm to 30 mm.

The skin member 10 may include a substance that is the same as the base fiber of the sound absorption material 20.

Also provided is a vehicle that includes the molded product described herein.

According to various exemplary embodiments of the present invention, a sound absorption material is capable of maintaining existing sound absorption performance and reducing the weight of a vehicle part using the sound absorption material.

According to various exemplary embodiments of the present invention, the process of manufacturing a vehicle part using the sound absorption material can be simplified, thus reducing processing time and costs.

The effects of the present invention are not limited to the foregoing, and should be understood to include all effects that can be reasonably anticipated from the following description.

Other aspect of the inventions are disclosed infra.

DETAILED DESCRIPTION

Figure 1:
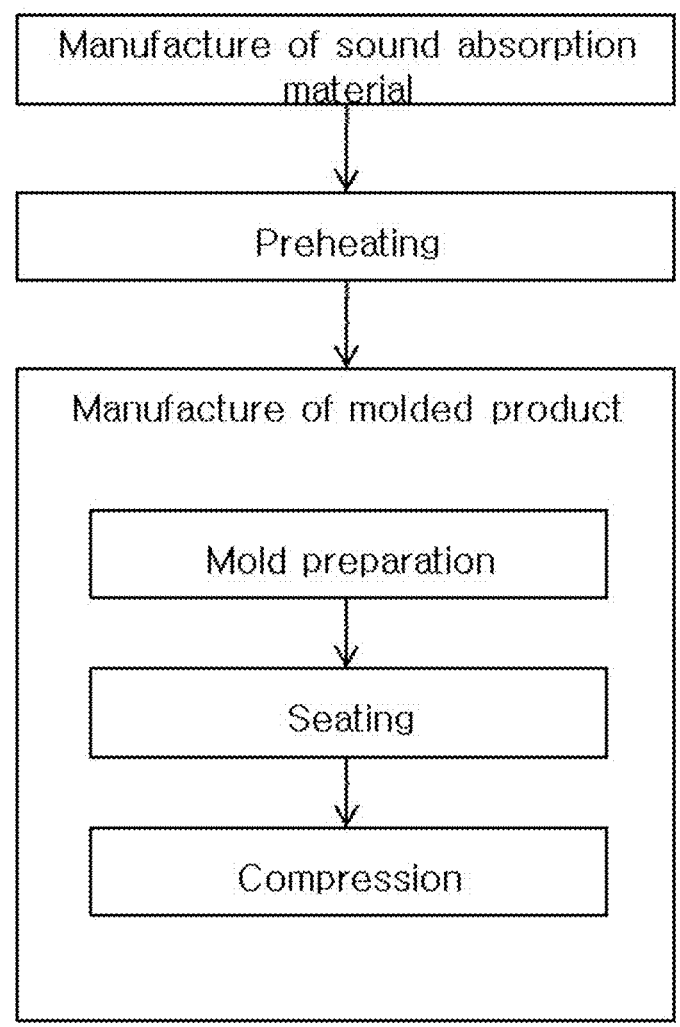
FIG. 1 is a flowchart showing an exemplary process of manufacturing an exemplary molded product using an exemplary sound absorption material according to an exemplary embodiment of the present invention.

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

When a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention pertains to a polyester sound absorption material, a method of manufacturing a molded product using the polyester sound absorption material, and a molded product manufactured by the method. Hereinafter, a description will be given of the method of manufacturing the molded product using the polyester sound absorption material of the present invention, and additionally, the polyester sound absorption material of the present invention and the molded product using the sound absorption material 20 are described.

In an aspect, the method of manufacturing the molded product using the polyester sound absorption material includes manufacturing a sound absorption material 20, for example, by mixing a base fiber including a polyester resin, an adhesive fiber including a low-melting-point polyester resin and a hollow fiber including a polyester resin, preheating the sound absorption material 20 in an oven, and manufacturing a molded product by subjecting the preheated sound absorption material 20 and a skin member 10 together to cold pressing.

Figure 2:
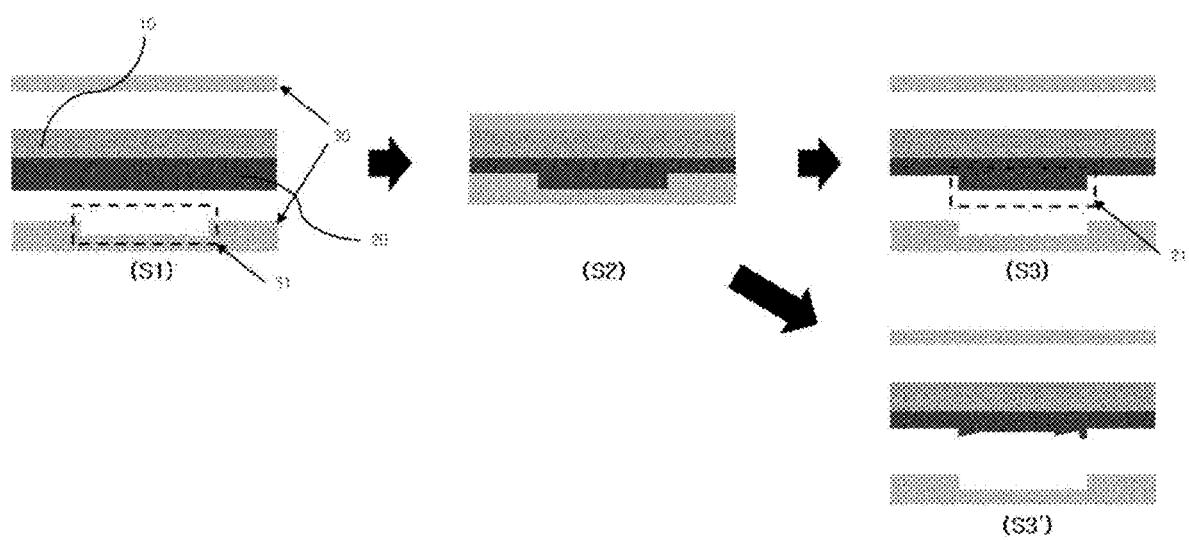
FIG. 2 shows an exemplary compression process according to an exemplary embodiment of the present invention.

FIGS. 1 and 2 show flowcharts showing the process of manufacturing the molded product using the polyester sound absorption material according to the present invention. With reference thereto, individual steps are specified below.

Manufacturing Sound Absorption Material 20

A sound absorption material 20 may include, for example, by mixing a base fiber including a polyester resin, an adhesive fiber including a low-melting-point polyester resin and a hollow fiber including a polyester resin. Particularly, the sound absorption material 20 including a web including the base fiber, the adhesive fiber and the hollow fiber may be manufactured.

The web may be manufactured through any one process selected from dry process, a wet process, a spunbond process and combinations thereof, and the process of manufacturing the web is not particularly limited in the present invention, so long as it is a process of typically manufacturing a web included in a sound absorption material 20 (i.e. "mixing fibers" in the present invention may be used in the same sense as "forming a web", to avoid confusion).

The sound absorption material 20 of the present invention may include at least one web that is stacked. When the sound absorption material 20 includes two or more webs, the webs may be bonded and stacked through any one process selected from the group consisting of adhering, heating, needle punching, jetting and combinations thereof.

The base fiber may include one or more selected from the group consisting of polyethylene terephthalate (PET), polybutylene terephthalate (PBT), polytrimethylene terephthalic acid (PTT), polyethylene naphthalate (PEN), polyethylene terephthalate glycol (PETG), and polycyclohexane dimethylene terephthalate (PCT).

The base fiber preferably may a fineness of about 3 to 10 denier (De).

The web may suitably include an amount of about 20 to 40 wt % of the base fiber based on the total weight of the web.

The adhesive fiber may include a polyester resin having a low melting point.

The melting point of the adhesive fiber may preferably range from about 80 to about 130° C.

The adhesive fiber preferably may include one or more selected from the group consisting of polyethylene terephthalate (PET), polyethylene (PE), polypropylene (PP), and polyamide (PA).

Unlike the base fiber and the hollow fiber, the adhesive fiber is melted at a relatively low temperature, which may increase the bonding force between the base fiber and the hollow fiber of the present invention. Moreover, the sound absorption material 20 may be integrally attached to the skin member 10 without a problem of detachment therefrom.

The web of the present invention may include an amount of about 40 to 60 wt % of the adhesive fiber based on the total weight of the web. When the amount of the adhesive fiber is less than about 40 wt %, the stiffness and durability of the sound absorption material 20 may decrease. When the amount thereof is greater than about 60 wt %, the sound absorption material 20 may become hardened.

The hollow fiber may suitably include one or more pores therein, the cross-section thereof may be a circular shape, a non-circular shape and combinations thereof.

The hollow fiber may suitably one or more selected from the group consisting of polyethylene terephthalate (PET), polybutylene terephthalate (PBT), polytrimethylene terephthalic acid (PTT), polyethylene naphthalate (PEN), polyethylene terephthalate glycol (PETG), and polycyclohexane dimethylene terephthalate (PCT).

The hollow fiber preferably may have a hollow core ratio of about 15 to 25%.

The hollow fiber may include crimps, and the number of crimps may preferably be about 10 to 25/inch. When the number of crimps is less than about 10/inch, the elastic force of the fiber may be reduced and thus the shape restorability of the sound absorption portion 21 after being subjected to external pressure may decrease, and moreover, the sound absorption portion 21 may be depressed and wrinkled. When the number of crimps is greater than about 25/inch, the elastic force of the fiber may be excessively increased and thus problems in moldability of the sound absorption material 20 may occur, which causes a problem of blurring the boundary of the sound absorption portion 21 of the sound absorption material 20.

The hollow fiber may suitably have a fineness of about 3 to 15 denier (De).

The web may suitably include an amount of about 15 to 25 wt % of the hollow fiber, or particularly an amount of about 18 to 23 wt % based on the total weight of the web. When the amount of the hollow fiber is less than about 15 wt %, the sound absorption portion 21 having a convex shape may not be properly formed on the sound absorption material 20 of the present invention. When the amount thereof is greater than about 25 wt %, the effect due to the addition of the hollow fiber may become insignificant.

Preheating

The heat absorption material 20 of the present invention including the web may be heat-treated in an oven. The heat treatment may be performed for 60 to 70 sec at a temperature of about 180 to 300° C. Through the heat treatment, the adhesive fiber of the present invention may be partially or completely melted, and the sound absorption material 20 may be made suitable for molding into a desired shape.

The oven may be used without particular limitation, so long as it may heat-treat the entirety of the sound absorption material 20. For example, the heat treatment method and device are not particularly limited.

The sound absorption material 20 may be heat-treated alone, or may be heat-treated in contact with the separately prepared skin member 10.

Manufacturing Molded Product

The preheated sound absorption material 20 and the skin member 10 may be pressed using a cold press to produce a molded product.

The skin member 10 may generally include a high-density nonwoven fabric capable of being applied to interior materials for vehicles.

The skin member 10 may include one or more selected from the group consisting of polyethylene terephthalate (PET), polybutylene terephthalate (PBT), polytrimethylene terephthalic acid (PTT), polyethylene naphthalate (PEN), polyethylene terephthalate glycol (PETG), and polycyclohexane dimethylene terephthalate (PCT). The skin member 10 may be preferably composed of the same substance as any one of substances included in the sound absorption material 20 in view of recycling. For example, the skin member 10 may include a substance that is the same as the base fiber of the sound absorption material 20.

Manufacturing the molded product may preferably include preparation of a mold 30, applying and compression.

Preparation of Mold 30 (S1)

A mold 30 having the shape of a molded product may be prepared. The cold press of the present invention may further include the mold 30. The mold 30 may be prepared as a frame for manufacturing a part into a desired shape.

The mold 30 may include a concave portion 31 that is able to form a sound absorption portion 21 having a convex shape on the sound absorption material 20. Preferably, the molded product of the present invention is configured such that the skin member 10 and the sound absorption material 20 are integrally molded. A portion of the sound absorption material 20 that requires more sound absorption performance may be needed, depending on the location of the part. For example, the inner shape of the mold 30 may be designed so that pressing is not performed at all, or so that only slight pressing may be performed such that a portion of the sound absorption material 20 requiring more sound absorption performance is formed thicker.

As shown in FIG. 2, a portion of the mold 30 in a direction contacting the sound absorption material 20 may be formed with a concave portion 31.

Seating (S2)

The sound absorption material 20 and the skin member 10 may be placed (seated) in the mold 30. The sound absorption material 20 and the skin member 10 may be provided separately or may be provided in the form of being laminated together, and may then be disposed or positioned.

As such, the mold 30, which applies pressure by contacting the sound absorption material 20, preferably includes a concave portion 31.

Compression (S3)

A molded product may be manufactured by pressing the sound absorption material 20 and the skin member 10. The pressing of the present invention may be performed through cold pressing. For example, the cold pressing may preferably be conducted at a temperature of about 10 to 15° C. for about 40 to 50 sec.

The skin member 10 and the sound absorption material 20 may be laminated through pressing and molded in the shape of a mold 30.

The skin member 10 and the sound absorption material 20 may be laminated and integrated into a single molded product.

The sound absorption material 20 included in the molded product may include a sound absorption portion 21. The sound absorption portion 21 may be formed by the concave portion 31 of the mold 30, and may have a specific embossed shape.

Typically, the sound absorption portion 21, which is formed so as to have a predetermined thickness in a convex shape, may not maintain the initial thickness of the sound absorption portion 21 a predetermined time after pressing. This is because it is difficult to maintain the shape thereof due to the characteristics of general fiber substances included in the sound absorption material 20. As shown in FIG. 2, when using a typical fiber substance S3', the sound absorption portion 21 may shrink and become distorted over time.

In the sound absorption material 20 including the base fiber, the adhesive fiber and the hollow fiber in the predetermined amounts, the thickness change of the sound absorption portion 21 may be very small.

The sound absorption portion 21 included in the sound absorption material 20 may have a thickness of about 8 mm to 30 mm, and the sound absorption portion 21 may exhibit a thickness change of less than about 3%, or particularly less than about 1%.

When the thickness of the sound absorption material 20 is about 4 mm or less, the thickness change may preferably be less than about 1.5-2%, and when the thickness of the sound absorption material 20 is about 1 to 3 mm, the thickness change may preferably be less than 1%. The time taken for the above thickness change to occur is not particularly limited, and the thickness change means the thickness difference starting immediately after molding until the thickness of the sound absorption portion 21, molded in the shape of the concave portion 31 through cold pressing, no longer changes.

EXAMPLE

A better understanding of the present invention will be given through the following examples, which are not to be construed as limiting the present invention.

Example 1

A felt, including 30 wt % of a base fiber including polyethylene terephthalate, 50 wt % of an adhesive fiber including low-melting-point polyethylene terephthalate and 20 wt % of a hollow fiber including polyethylene terephthalate and having a hollow core ratio of 18 wt % and a circular cross-section, was prepared, and the felt was temporarily bonded to a skin member 10 including polyethylene terephthalate fiber having a fineness of 7 denier, placed in an oven, and preheated at a temperature of 200° C. for 60 sec.

The preheated felt and skin member 10 were disposed or positioned in a mold 30 of a cold press. Here, the concave portion 31 is formed in the mold 30 located in a direction contacting the felt.

The bonded felt and skin member 10 were subjected to cold pressing at a temperature of 15° C. for 50 sec with the mold 30 to produce a molded product. Here, the thickness of the sound absorption portion 21 formed immediately after the pressing was 10 mm.

Figure 3A:
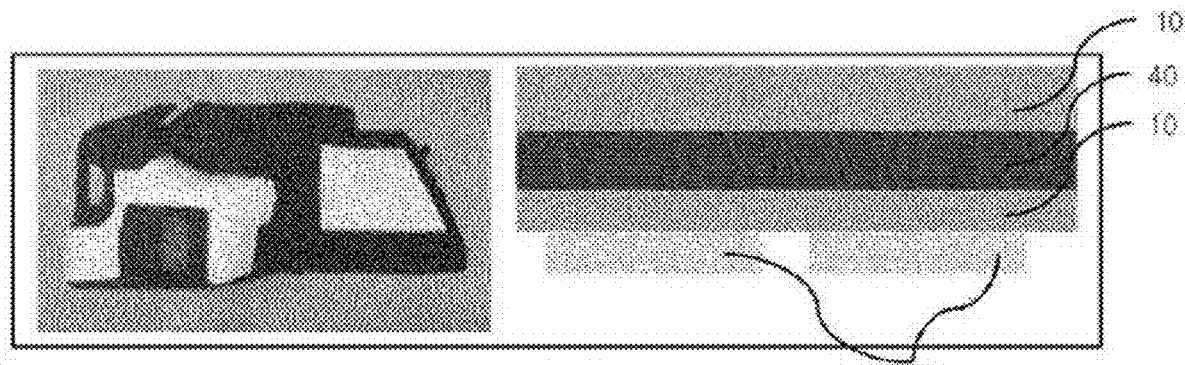
FIGS. 3A to 3D show the products of Comparative Example 2 and Examples 1 to 3 according to exemplary embodiments of the present invention.
Figure 3B:
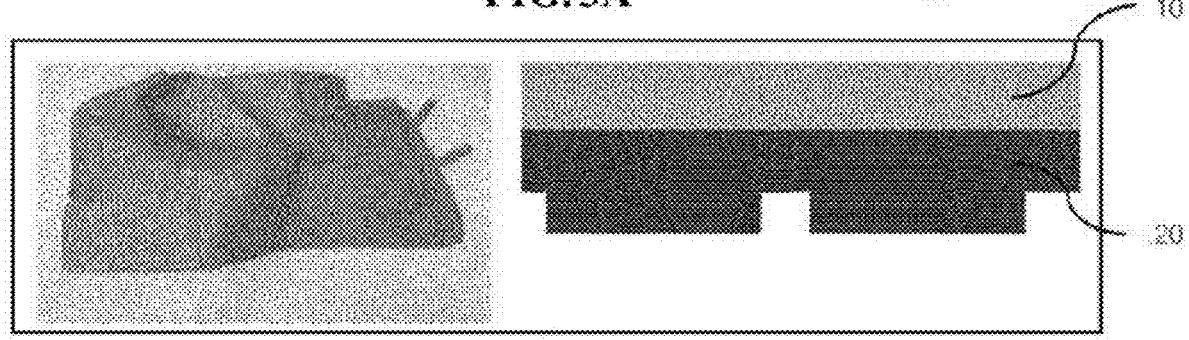

The molded product manufactured in Example 1 is shown in FIG. 3B.

Comparative Example 1

A felt, including 50 wt % of a base fiber including polyethylene terephthalate and 50 wt % of an adhesive fiber including low-melting-point polyethylene terephthalate, was prepared, and the felt was temporarily bonded to a skin member 10, placed in an oven, and preheated at a temperature of about 320° C. (the inner atmosphere temperature of the oven was 190° C.) for 60 sec.

The preheated felt and skin member 10 were applied and seated in a mold 30 of a cold press. Here, the concave portion 31 is formed in the mold 30 located in a direction contacting the felt.

The bonded felt and skin member 10 were subjected to cold pressing at a temperature of 15° C. for 50 sec with the mold 30 to produce a molded product. Here, the thickness of the sound absorption portion 21 formed immediately after the pressing was 10 mm.

Comparative Example 2

An extrusion sheet, including 70 wt % of polypropylene and 30 wt % of talc, was prepared, and a skin member 10 was temporarily bonded to the upper and lower surfaces of the extrusion sheet, placed in an oven, and preheated at a temperature of about 320° C. (the inner atmosphere temperature of the oven was 190° C.) for 60 sec.

The preheated extrusion sheet and skin member 10 were disposed and positioned in a mold 30 of a cold press. The bonded extrusion sheet and skin member 10 were subjected to cold pressing at a temperature of 15° C. for 50 sec with the mold 30 to produce a molded product.

A sound absorption pad 60 having a thickness of 10 mm was attached to the surface of the manufactured molded product using an adhesive at the same position as the sound absorption portion 21 of Example 1. Here, the sound absorption pad 60 was composed of a nonwoven fabric (3M Thinsulate) made of microfiber including polypropylene.

The molded product manufactured in Comparative Example 2 is shown in FIG. 3A.

Example 2

The sound absorption pad 60 of Comparative Example 2 was attached to a portion of the sound absorption portion 21 of the molded product manufactured in Example 1.

Figure 3C:
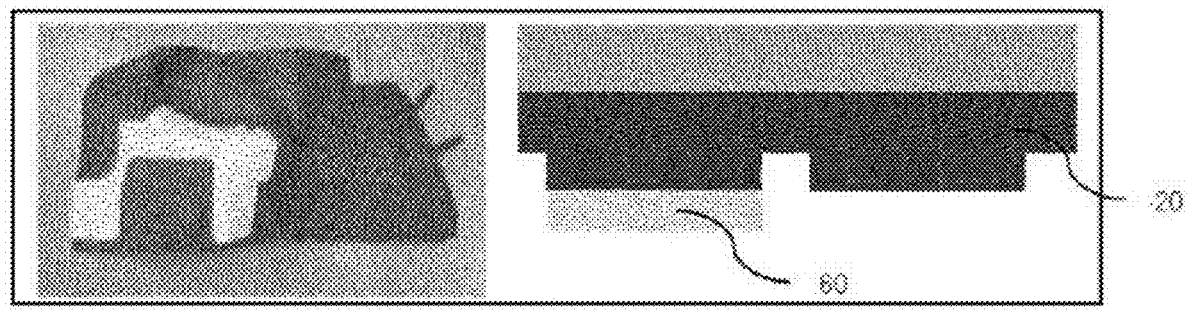

The molded product manufactured in Example 2 is shown in FIG. 3C.

Example 3

The sound absorption pad 60 of Comparative Example 2 was attached to the entire sound absorption portion 21 of the molded product manufactured in Example 1.

Figure 3D:
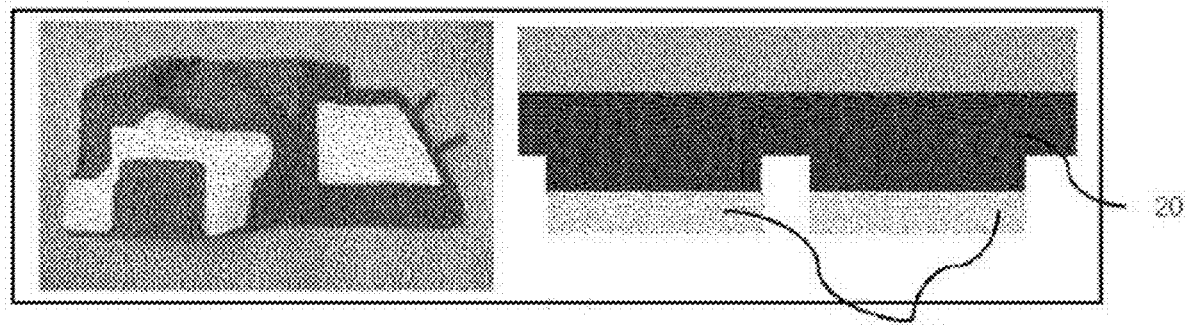

The molded product manufactured in Example 3 is shown in FIG. 3D.

Comparative Examples 3 and 4

The molded products of Comparative Examples 3 and 4 were manufactured in the same manner as in Example 1, with the exception that the composition of the felt was adjusted as shown in Table 1 below.

TABLE 1

|  |  | Example 1 | Comparative Example 3 | Comparative Example 4 |
|---|---|---|---|---|
| Felt | Base fiber (wt %) | 30 | 35 | 20 |
|  | Adhesive fiber (wt %) | 50 | 55 | 50 |
|  | Hollow fiber (wt %) | 20 | 10 | 30 |

Test Example 1

Figure 4A:
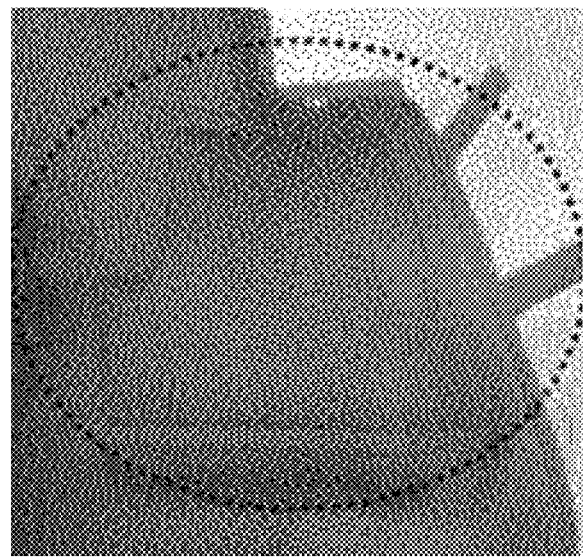
FIGS. 4A and 4B show exemplary products of Test Example 1 according to exemplary embodiments of the present invention.
Figure 4B:
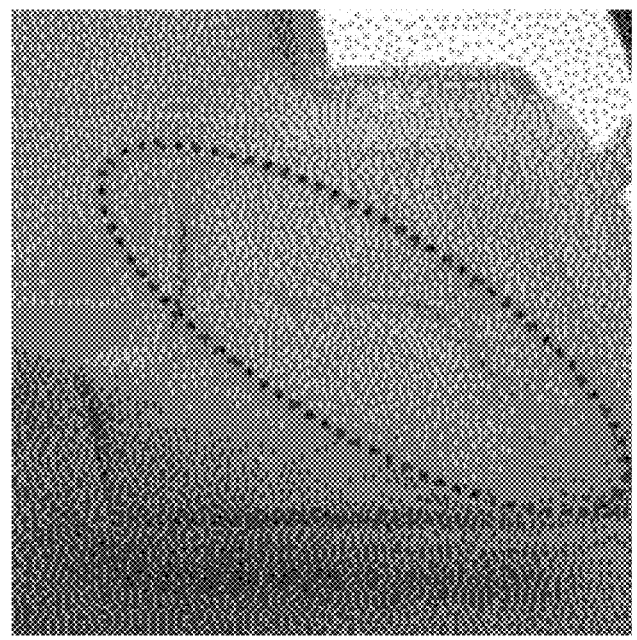

After waiting until the thickness of the sound absorption portion 21 of the molded product manufactured in each of Example 1 and Comparative Example 1 no longer changed, the final molded products were compared, and are shown in FIGS. 4A and 4B. FIG. 4A shows the molded product manufactured in Example 1 and FIG. 4B shows the molded product manufactured in Comparative Example 1.

As shown in FIG. 4A, it can be seen that the sound absorption portion 21 maintained its shape without shrinking or distortion, whereas the molded product of FIG. 4B shows that portions of the sound absorption portion 21 shrank and became distorted.

Test Example 2

Figure 5:
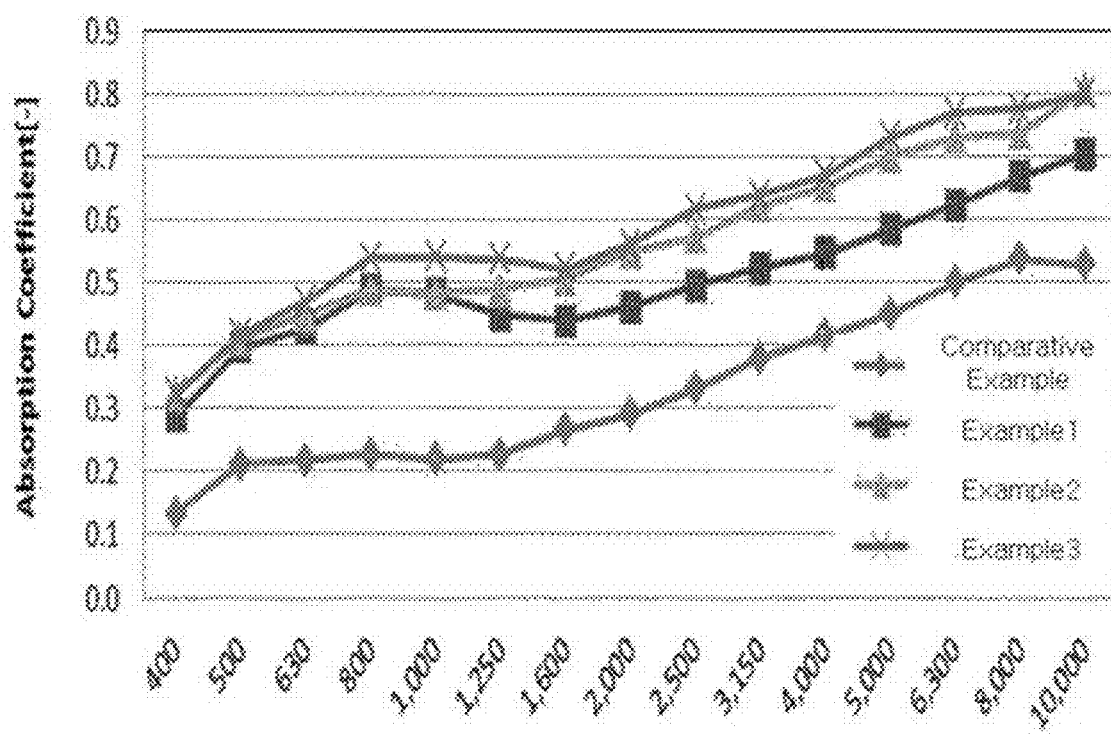
FIG. 5 is a graph showing the results of measurement of sound absorption performance of parts, which are the products of Examples 1 to 3 and Comparative Example 2.

The molded product manufactured in each of Comparative Example 2 and Examples 1 to 3 was measured for sound absorption performance in the frequency range of 400 to 10,000 Hz in a simple reverberation chamber. The results thereof are shown in FIG. 5.

With reference to the graph, even when the sound absorption pad was not attached, the sound absorption performance of Example 1 was superior to that of Comparative Example 2. Moreover, when the sound absorption pad 60 was attached in Example 1, as in Examples 2 and 3, it can be confirmed that a molded product having further improved sound absorption performance was obtained.

Test Example 3

Figure 6A:
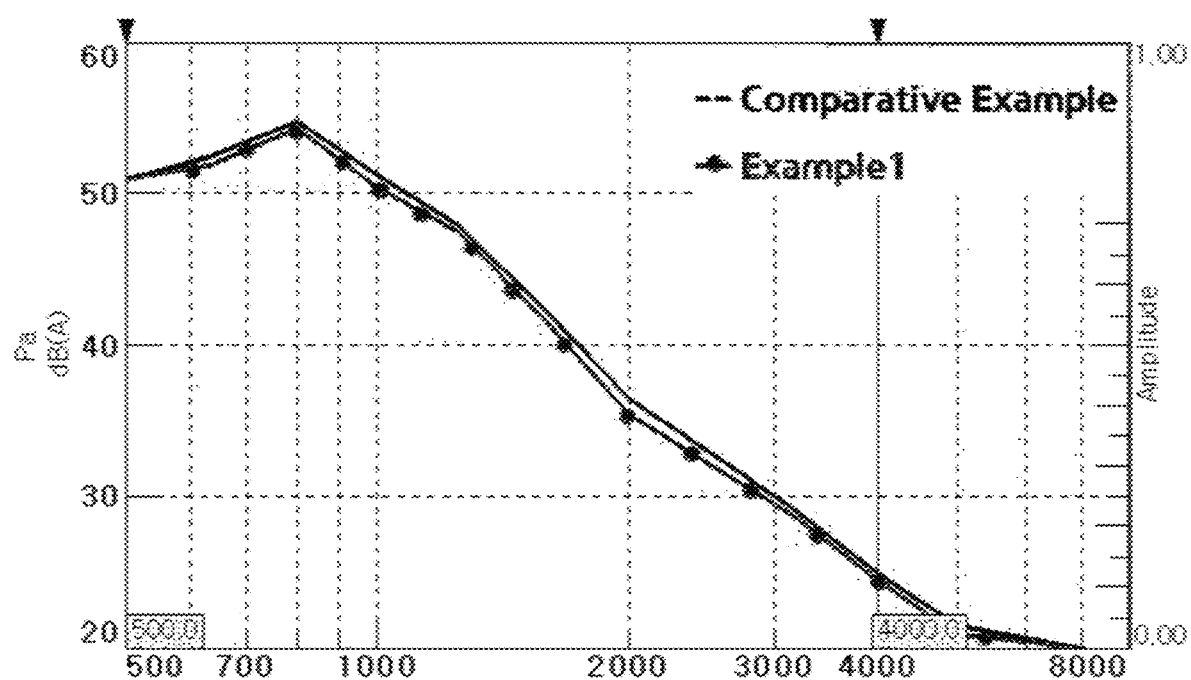
FIGS. 6A and 6B are graphs showing the results of measurement of noise generated from vehicles using the parts manufactured in Example 1 and Comparative Example 2.
Figure 6B:
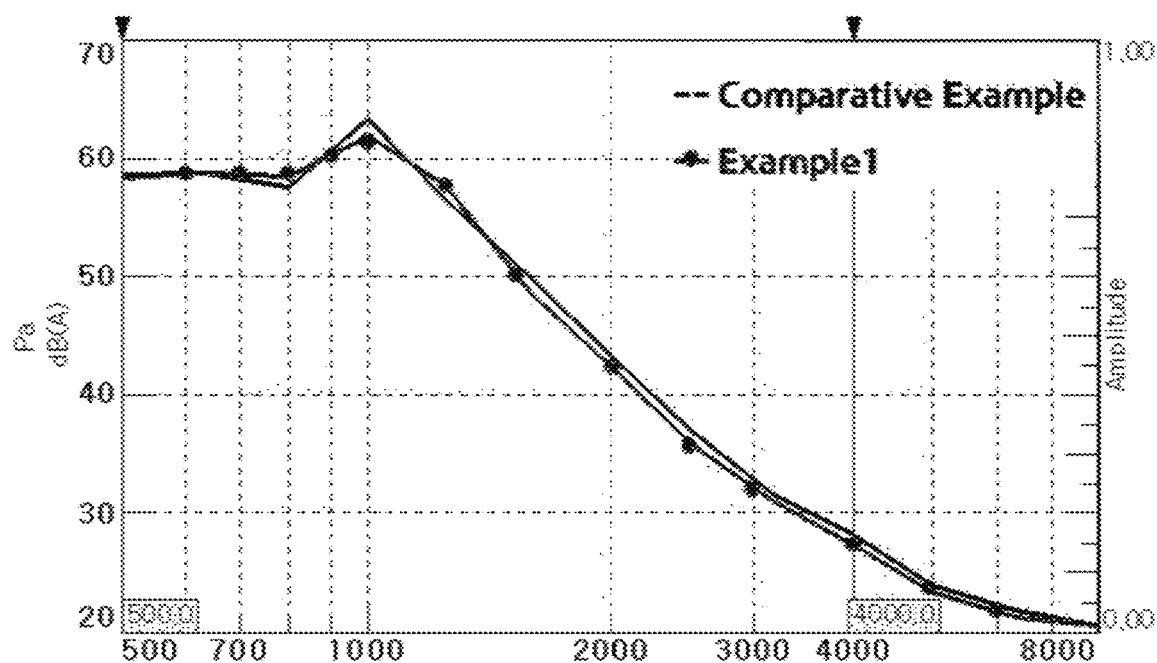

The molded product manufactured in each of Comparative Example 2 and Example 1 was mounted to an actual vehicle and noise in the rear seat during driving (FIG. 6A) and trunk indoor proximity noise (FIG. 6B) were measured. With reference thereto, it can be confirmed that there was no difference between the effect of Example 1 of the present invention and the effect of Comparative Example 2.

Test Example 4

The molded products of Example 1 and Comparative Examples 3 and 4 were evaluated for outer appearance of the sound absorption portion 21, part stiffness and sound absorption performance. The results thereof are shown in Table 2 below.

TABLE 2

|  |  | Example 1 | Comparative Example 3 | Comparative Example 4 |
|---|---|---|---|---|
| Formability of sound absorption portion 21 | | 10 | 6 | 10 |
| Strength of molded product | Warping | 8 | 9 | 5 |
| | Shaking | 8 | 9 | 4 |
| Sound absorption performance | | 100% | 60% | 100% |

* Formability of sound absorption portion 21: The outer appearance of the sound absorption portion 21, such as distortion, was evaluated by 10 persons, and an average of scores thereof was calculated (out of 10)
* Strength of molded product: Based on the result in which the extent of warping/shaking of the molded product of Comparative Example 2 was determined to be 10, the strength of each molded product (warping, shaking) was evaluated.
* Warping: The extent of endurance of the molded product was measured when the molded product was fixed on the floor and force was applied in a direction perpendicular thereto.
* Shaking: The extent of endurance of the molded product was measured when the molded product was fixed on the floor and force was applied in a direction parallel thereto.
* Sound absorption performance: Based on the arithmetic mean value of AC (Absorption Coefficient) values obtained at specific frequencies of Example 1 in Test Example 2, the percentage of the AC arithmetic mean value of each of Comparative Example 3 and Comparative Example 4, determined at the same frequency as Example 1, was calculated.

As shown in Table 2, in the molded product of Comparative Example 3, the formability of the sound absorption portion 21 was very poor, and the sound absorbing performance was also significantly lower than that of Example 1. Also, in Comparative Example 4, the sound absorption portion 21 was well formed, but the strength of the molded product was very low.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a molded product using a polyester sound absorption material, comprising:
   manufacturing a sound absorption material comprising i) a base fiber comprising a polyester resin, ii) an adhesive fiber comprising a low-melting-point polyester resin and iii) a hollow fiber comprising a polyester resin;
   preheating the sound absorption material in an oven; and
   manufacturing a molded product by pressing the preheated sound absorption material and a skin member together,
   wherein the molded product is configured such that the sound absorption material is integrally attached,
   the sound absorption material comprises an amount of about 20 to 40 wt % of the base fiber, an amount of about 40 to 60 wt % of the adhesive fiber and an amount of about 15 to 25 wt % of the hollow fiber based on the total weight of the sound absorption material.

2. The method of claim 1, wherein the pressing is performed at a temperature of about 10 to 15° C. for about 40 to 50 sec.

3. The method of claim 1, wherein the manufacturing the molded product comprises:
   preparing a mold having a shape of a molded product;
   disposing a sound absorption material and a skin member in the mold; and
   subjecting the sound absorption material and the skin member to cold pressing.

4. The method of claim 3, wherein the mold comprises a concave portion for forming a sound absorption portion having a convex shape on the sound absorption material.

5. The method of claim 4, wherein the sound absorption material located at the concave portion of the mold exhibits a thickness change of less than about 3%.

* * * * *